(12) United States Patent
Tang

(10) Patent No.: US 7,872,860 B2
(45) Date of Patent: Jan. 18, 2011

(54) PORTABLE APPARATUS, FASTENING DEVICE AND LOCKING MECHANISM THEREOF

(75) Inventor: Xue-Dong Tang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 75 days.

(21) Appl. No.: 12/487,668

(22) Filed: Jun. 19, 2009

(65) Prior Publication Data

US 2009/0316343 A1    Dec. 24, 2009

(30) Foreign Application Priority Data

Jun. 20, 2008    (CN) .................... 2008 1 0302239

(51) Int. Cl.
*G06F 1/16*    (2006.01)

(52) U.S. Cl. .................. 361/679.01; 70/57.1; 206/576; 455/575.1; 312/265.6

(58) Field of Classification Search ..................... 70/58, 70/57.1; 429/96, 97, 100; 361/679.4, 679.01, 361/679.33, 679.55, 679.32, 679.6, 679.57, 361/679.02, 679.43, 679.39; 206/710, 711, 206/522, 315.4, 576, 521.1, 454; 455/575.1, 455/573, 90.3; 312/223.1, 223.2, 265.6
See application file for complete search history.

(56) References Cited

U.S. PATENT DOCUMENTS

| 2007/0087263 | A1* | 4/2007 | Ge et al. ....................... 429/97 |
| 2010/0043503 | A1* | 2/2010 | Yao .............................. 70/58 |
| 2010/0081045 | A1* | 4/2010 | Li ............................... 429/100 |
| 2010/0143777 | A1* | 6/2010 | Zhang et al. ................ 429/100 |

\* cited by examiner

*Primary Examiner*—Hung V Duong
(74) *Attorney, Agent, or Firm*—Frank R. Niranjan

(57) ABSTRACT

A portable apparatus includes an electronic device; and a fastening device detachably attached to the electronic device. The fastening device includes a cover comprising a hook for inserting in the electronic device; a pressing member capable of being movable locked and unlocked from the cover; a locking member fastened on the cover and engaged with the pressing member, and an activating member disposed on the cover for activating the pressing portion to unlock from the cover. The locking member includes an inserting portion for inserting into the locking slot to lock the hook in the electronic device.

20 Claims, 6 Drawing Sheets

PORTABLE APPARATUS, FASTENING DEVICE AND LOCKING MECHANISM THEREOF

BACKGROUND

1. Technical Field

The present disclosure relates to portable apparatuses, and more particularly to fastening a portable apparatus to an object.

2. Description of Related Art

Portable electronic devices such as handheld flat screen televisions, and portable disc players are widely used because of small sizes. Users may carry their portable electronic devices when travelling for business or entertainment. However, the users may have to hold the portable electronic devices in their hands or rest on their thighs or on a flat surface of the vehicle they are travelling on. After a period of time, the users hands or thighs may become tired or the electronic devices may fall off the table due to the vehicle turning or bumps in the road.

Therefore, a need exits for providing a fastening device that the electronic device can be secured thereof.

DETAILED DESCRIPTION

Figure 1:
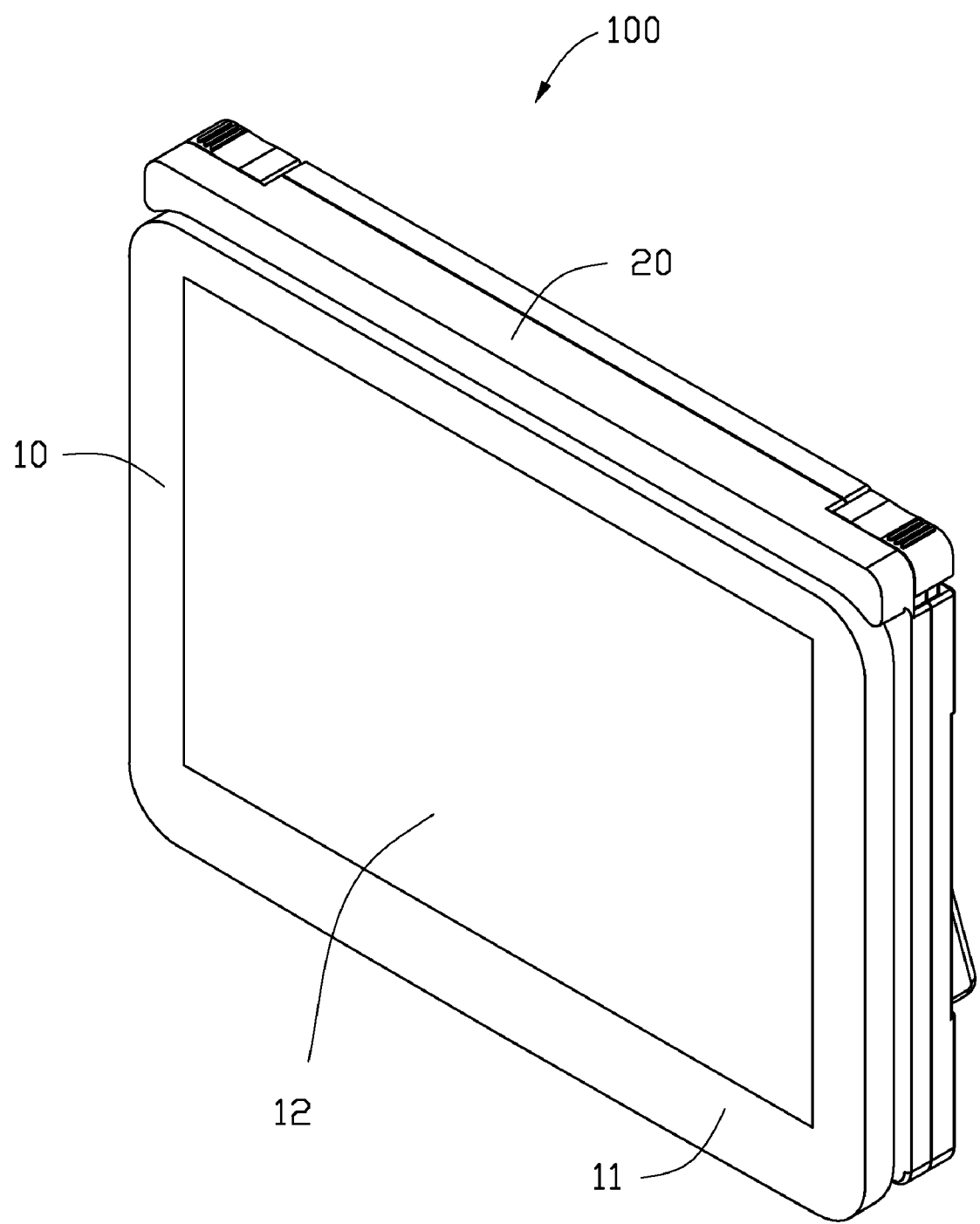
FIG. 1 is an isometric view of an electronic device, comprising a fastening device and an electronic device fixed thereon, in accordance with an exemplary embodiment.
Figure 2:
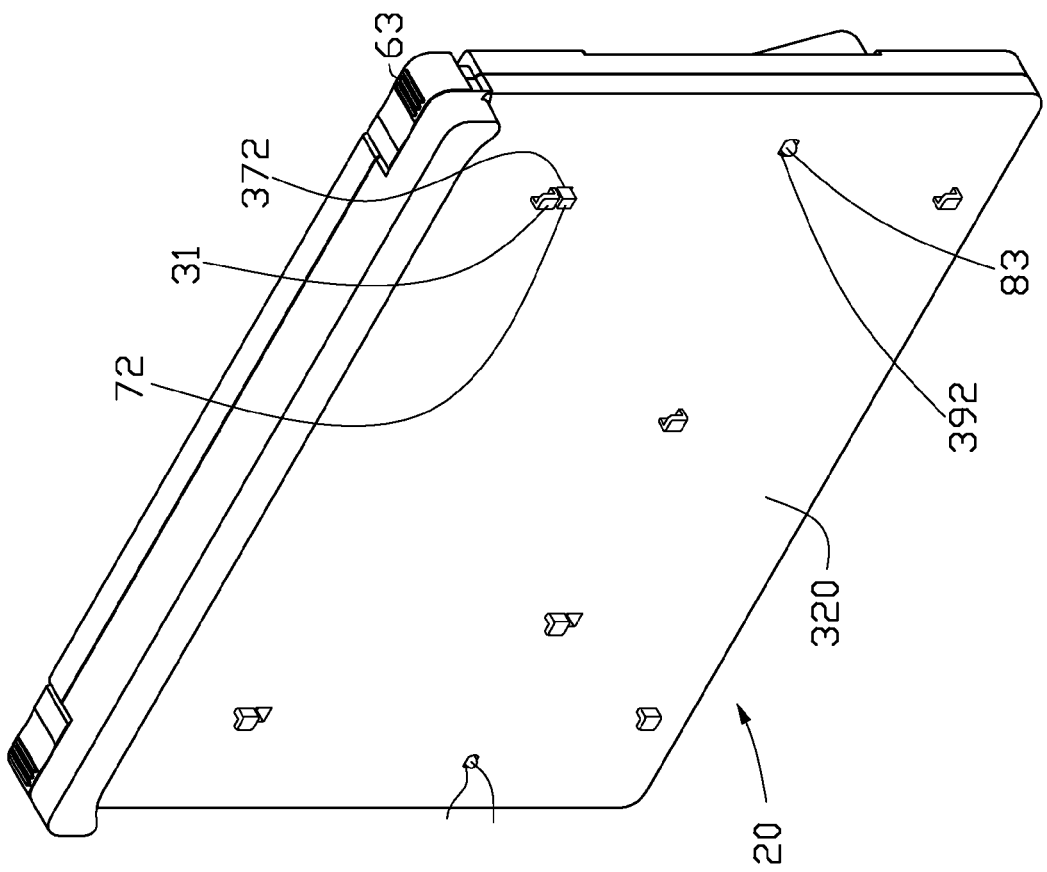
FIG. 2 is an exploded, isometric view of the electronic device of FIG. 1.

Referring to FIGS. 1 and 2, a portable apparatus 100 includes an electronic device 10 and a fastening device 20 detachably attached to the electronic device 10 for positioning the electronic device 10 to another object (not shown). The electronic device 10 may be a handheld flat screen television, a portable disc player, and so on.

The electronic device 10 is substantially rectangular-shaped, and includes a front side 11 and a rear side 13. The front side 11 may be a viewing surface. A display 12 is normally formed on the front side 13. The electronic device further defines several locking slots 140 in the rear side 13.

Figure 3:
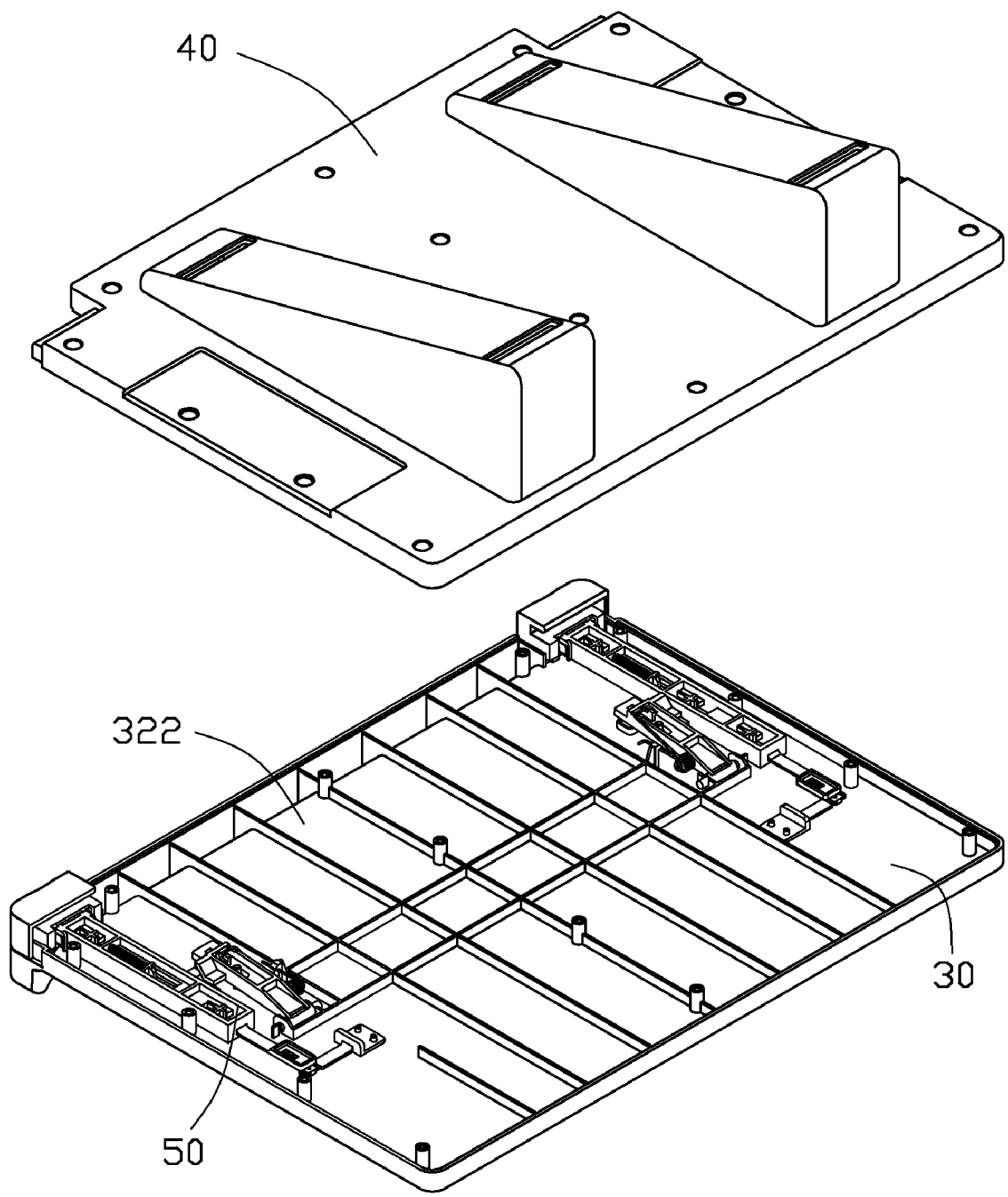
FIG. 3 is an exploded, isometric view of the fastening device of FIG. 2.

Referring to FIG. 3, the fastening device 20 includes a front cover 30, a rear cover 40 engaged with the front cover 30, two locking mechanisms 50 disposed between the front cover 30 and the rear cover 40. The front cover 30 is sandwiched between the rear cover 40 and the electronic device 10 when the portable apparatus 10 is assembled.

Figure 4:
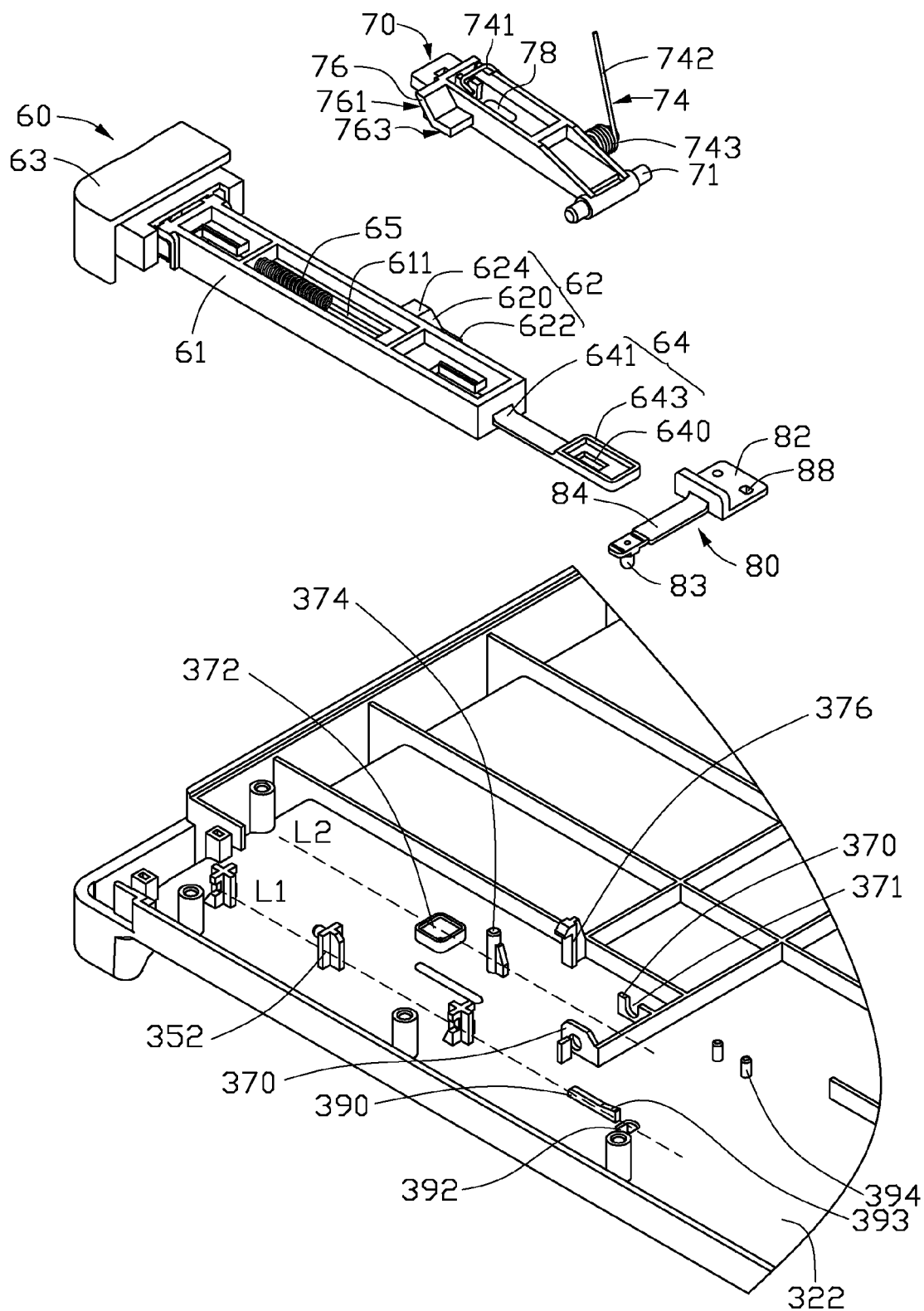
FIG. 4 is a partial exploded, isometric view of the fastening device of FIG. 3.
Figure 5:
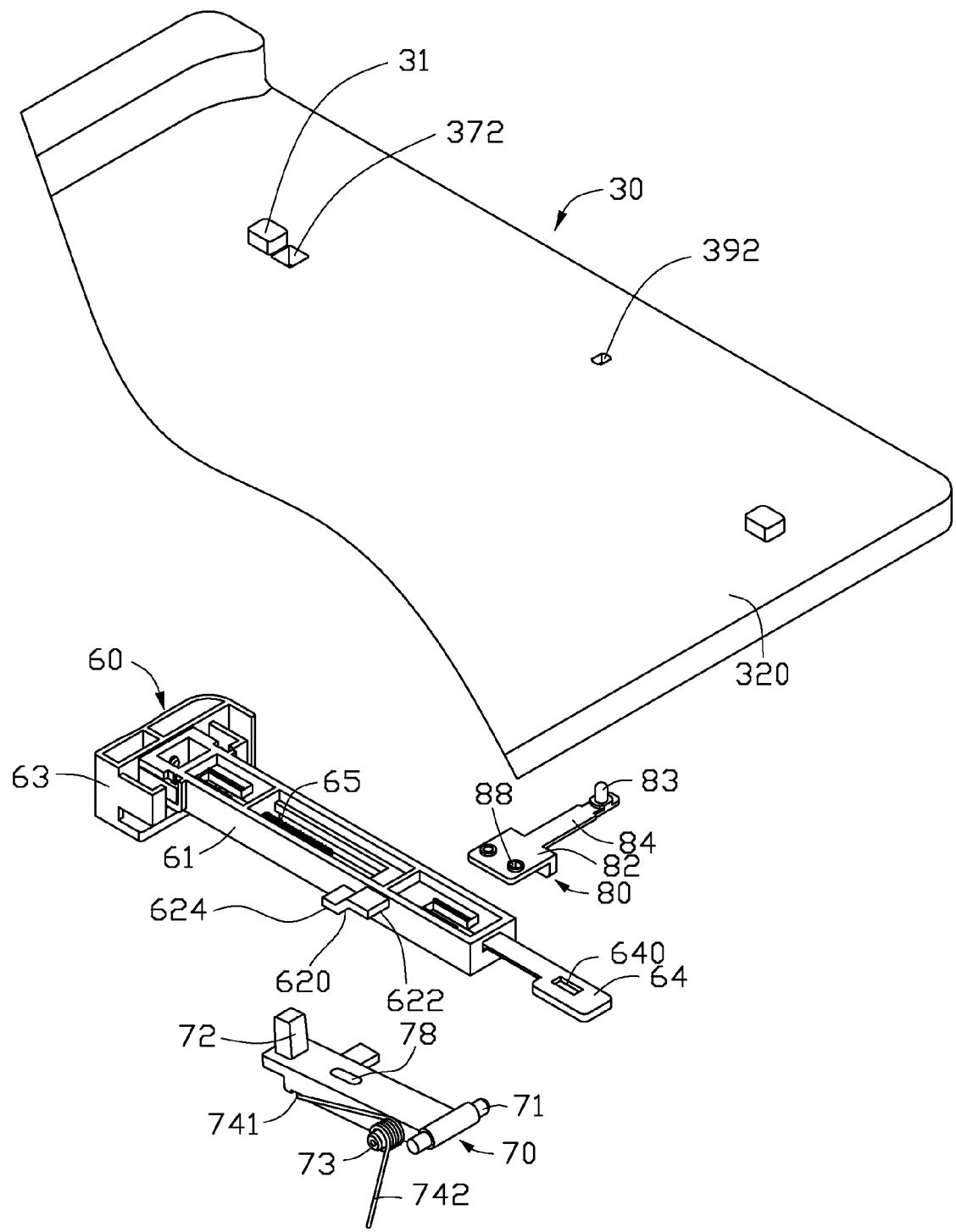
FIG. 5 is a reverse isometric view of the fastening device of FIG. 4.

Referring to FIGS. 4 and 5, the front cover 30 includes an outer surface 320 facing the electronic device 10 and an inner surface 322 facing the rear cover 40. A pair of openings 372 is defined in the front cover 30 through the outer surface 320 and the inner surface 322. The openings 372 are correspondingly located to two of the locking slots 140. A pair of through holes 392 are also defined in the front cover 30 through the outer surface 320 and the inner surface 322. Two hooks 31 are formed on the outer surface 320 and adjacent to the openings 372 correspondingly.

A plurality of positioning posts 352 and a locking portion 390 extend perpendicularly from the inner surface 322 of the front cover 30 at a side of each opening 372. The positioning posts 352 are aligned in a first line L1. The first line L1 extends through the locking portion 390 and the through hole 392 with the locking portion 390 located between the positioning posts 352 and the corresponding through hole 392. The locking portion 390 has an inclined contact surface 393. The inclined contact surface 393 extends away from the inner surface 322 of the front cover 30 along a first direction D1 (shown in FIG. 6). The first direction D1 is parallel to the first line L1 from the positioning posts 352 to the locking portion 390.

A limiting post 374 and two positioning posts 394 also protrude from the inner surface 322 of the front cover 30. The limiting post 374 and the opening 372 are arranged in a second line L2 parallel to the first line L1. Two fixing blocks 370 are disposed at two sides of the line L2 and near the locking portion 390 respectively. Each of the fixing blocks 370 defines a pivoting hole 371. A fixing portion 376 protrudes from the inner surface 322 at a side of the first line L1 opposite to the second line L2. The fixing portion 376 has a hook end (not labeled).

Figure 6:
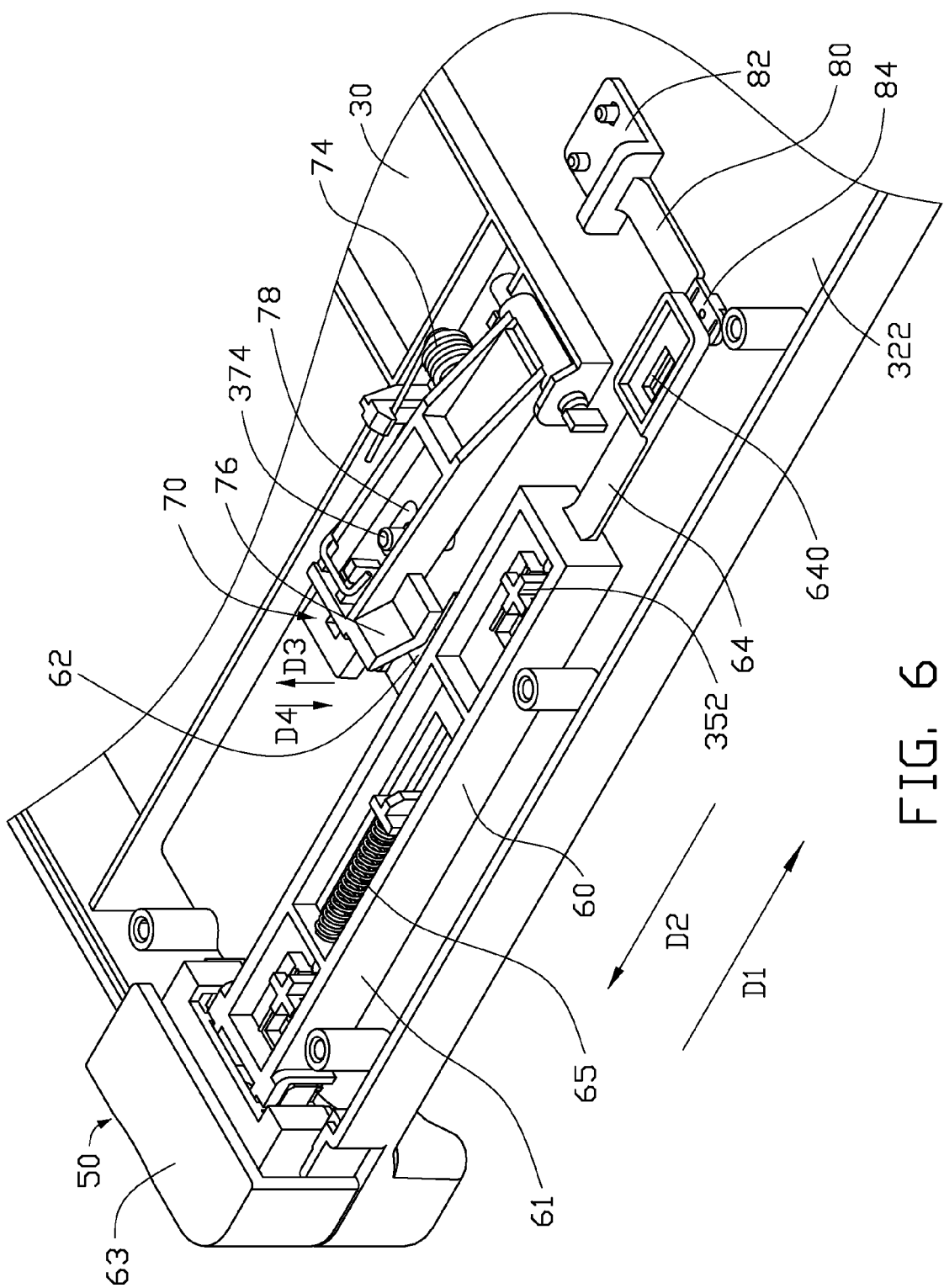
FIG. 6 is a partial enlarged view of the fastening device of FIG. 3.

Further referring to FIG. 6, each of the locking mechanism 50 is mounted on the inner surface 322 of the front cover 30. The locking mechanism 50 includes a pressing member 60 movably disposed on the inner surface 322, a locking member 70 pivotally attached on the inner surface 322, and an activating member 80 fastened on the inner surface 322.

The pressing member 60 includes a base 61, a driving portion 62, a pressing portion 63, a locking arm 64, and a first resilient member 65. The pressing portion 63 and the locking arm 64 are disposed at opposite ends of the base 61 correspondingly. The driving portion 62 extends perpendicularly from a side of the base 61. The first resilient member 65 is received in the base 61.

The base 61 is substantially rectangular in shape, and defines a plurality of guiding slots 611 (FIG. 4). Each of the guiding grooves 611 is elongated. The base 60 is disposed on the front cover 30 such that the guiding posts 352 are slideably received in the guiding grooves 611 correspondingly, thus the base 60 is movable relative to the front cover 20. In other words, the base 61 is movable along the first direction D1 when disposed on the front cover 30.

The driving portion 62 is disposed on the base 61 adjacent to the opening 372, and substantially stepped-shaped. The driving portion 62 includes a driving surface 620, and two supporting surfaces 622, 624 connecting with opposite edges of the driving surface 622. The driving surface 620 is disposed obliquely between the two supporting surfaces 622, 624. The driving surface 620 inclines away from the inner surface 322 of the front cover 30 along a second direction D2 when the pressing member 60 is assembled on the front cover 30. The second direction D2 is opposite to the first direction D1. The two supporting surfaces 622, 624 are parallel to each other, and a projection of the supporting surface 622 does not overlapped on the supporting surface 624 in a plane parallel to the supporting surface 624.

The pressing portion 63 may be exposed from the front cover 30 to be pressed conveniently. The locking arm 64 is an elongated deformable arm with opposite ends 641, 643. The end 641 of the locking arm 64 is fastened on the base 61 and the other end 643 is a free contact end. A locking groove 640 is defined in the contact end 643. When the pressing member 60 is pressed, the contact end 643 of the locking arm 64 is slideable on the inclined contact surface 393 of the locking portion 390, and receives a portion of the locking portion 390 in the locking groove 640, therefore, the pressing member 60 becomes locked in the front cover 30.

The first resilient member 65 is received in one of the plurality of guiding grooves 611 of the base 61 with an end fastened on the base 61 and another end fastened on the guiding post 352 received in one of the plurality of guiding grooves 611. The first resilient member 65 may be a compression spring resisted between the base 61 and the guiding post 352 correspondingly. While the pressing member 60 is pressed, the first resilient member 65 may be compressed to provide a force that drives the pressing member 60 to move along the second direction D2.

The locking member 70 engages with the pressing member 60. A pivot shaft 71 and an inserting portion 72 are correspondingly disposed at opposite ends of the locking member 70. The pivot shaft 71 is rotatably received in the pivoting holes 371 of the fixing blocks 370. The inserting portion 72 may be a protrusion facing the inner surface 322 of the front cover 30, and may pass through the opening 372 to fill into the corresponding locking slot 140 of the electronic device 10. A limiting hole 78 is defined in the locking member 70 for receiving the limiting post 374. A fixing post 73 protrudes from a side surface of the locking member 70, adjacent to the shaft 70.

The locking member 70 further includes a second resilient member 74 and a driven portion 76. The second resilient member 74 may be a torsion spring including a winding 743, a first end 741, and a second end 742 extending from two ends of the winding 743. The winding 743 is sleeved on the fixing post 73. The first end 741 is fixed on the locking member 70, and the second end 742 resists against the fixing portion 376 of the front cover 30. The driven portion 76 engages with the driving portion 62. The driven portion 76 includes an inclined driven surface 761 substantially parallel to the driving surface 620, and a supported surface 763 connecting with the driven surface 761 and substantially parallel with the supporting surface 622, 624. The driving surface 620 is engageable with the driven surface 761 to push the driven surface 761 to move toward a third direction D3 and a forth direction D4 when the pressing member 60 is pressed by the user. The third direction D3 is a reverse direction of the forth direction D4, and perpendicular to the first direction D1 and the second direction D2.

The activating member 80 includes a positioning portion 82, an activating arm 84 with one end connecting with the positioning portion 82, and an activating portion 83 perpendicularly extending from the other end of the activating arm 84. The positioning portion 82 defines two positioning holes 88 corresponding to the two positioning posts 394. The positioning posts 394 are engageably received in the positioning holes 88, thus, the activating member 80 is fastened on the inner surface 322 of the front cover 30. The activating arm 84 is a deformable arm. The activating arm 84 is disposed between the contact end 643 of the locking arm 64 and the inner surface 322 of the front cover 30. The activating portion 83 is insertable into the through hole 392 and protrudes through the through hole 392.

In assembly, first, the pressing member 60 is slidably assembled on the front cover 30. The guiding posts 352 may pass through the guiding grooves 611 respectively and are slideable relative to the front cover 30. The pressing portion 63 protrudes from the front cover 30 to be pressed conveniently. The first resilient member 65 is disposed in the groove 611 of the base 61, one end is fastened on the base 61 and the other end is fastened on the guiding posts 352, and resists against the base 61 and the guiding post 352. Then, the positioning posts 394 are inserted into the positioning holes 88. The activating portion 83 is inserted into the through hole 392 and protrudes through the through hole 392. The activating arm 84 is located between the locking arm 64 and the activating arm 84. The shaft 71 of the locking member 70 is inserted into the pivoting hole 371, thus, the locking member 70 is pivotally coupled on the front cover 30. Finally, the inserting portion 72 is inserted in the opening 372 and protrudes through the opening 372 and into the locking slot 140 to prevent the hook 31 from separating from the locking slot 140.

When the electronic device 10 needs to be detached from the fastening device 20, the pressing members 60 slides along the first direction D1 by pressing on the pressing portions 63. The locking arms 64 may deform and slide up along the inclined contact surfaces 393 until portions of the locking portions 390 are received in the locking grooves 640, therefore, the pressing members 60 are locked, and the contact end 643 of the locking arm 64 is located on the activating arm 84. Simultaneously, the first resilient members 65 are compressed, the driving surfaces 620 drive the driven surfaces 762 to slide on the driving surfaces 620 along the third direction D3, therefore, the driven portions 76 are lifted up by the driving portions 62, and the supported surfaces 763 switch from supported on the supporting surfaces 622 to supported on the supporting surfaces 624, the locking members 70 rotate around the shafts 71 until the inserting portions 72 withdraw from the locking slots 140 to allow the hooks 31 to disengage from the locking slots 140, the second resilient members 74 may be twisted, therefore, the electronic device 10 is disassembled from the fastening device 20.

When the electronic device 10 is needed to assemble on the fastening device 20, the hooks 31 engage in the locking slots 140 and hook on the electronic 10, such that, the outer surfaces 320 contacts the electronic device 10. Therefore, the activating portions 83 are pushed, in order to lift up the locking arms 64 to release from the locking portions 390, and the pressing members 60 may move along the second direction D2 because of the force applied by the first resilient members 65, and the driven portions 76 are lowered down along the forth direction D4 because of the force applied by the second resilient members 74, and the supported surfaces 763 switch from being supported on the supporting surfaces 624 to be supported on the supporting surfaces 622, and the inserting portions 72 insert into the locking slots 140 to prevent the hooks 31 from separating from the locking slots 140. Therefore, the electronic device 10 is assembles on the fastening device 20, where the fastening device 20 may be attached to the back of a chair or other similar surface via adhesive or wiring to stable hold the electronic device 10.

It is to be understood, however, that even though numerous characteristics and advantages of the present disclosure have been set forth in the foregoing description, together with details of the structure and function of the present disclosure, the present disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A portable apparatus comprising:
   an electronic device defining a locking slot; and
   a fastening device detachably attached to the electronic device, the fastening device comprising:
   a cover comprising a hook capable of being received in the locking slot of the electronic device, the cover defining an opening and a through hole, the opening adjacent to the hook;
   a pressing member disposed on the cover, the pressing member capable of being movable along a first direction to be locked on the cover and movable along a second direction which is a reverse direction to the first direction to unlocked from the cover;
   a locking member fastened on the cover and contacting with the pressing member to be engaged by the pressing member, the locking member movable along a third direction when the pressing member moves along the first direction and movable along a fourth direction when the pressing member moves along the second direction, the locking member comprising an inserting portion capable of protruding through the opening to insert into the locking slot after the locking member move along the fourth direction and drawing back from the locking slot after the locking member move along the three direction; and
   an activating member disposed on the cover, the activating member capable of activating the pressing portion to unlock from the cover, the activating member comprising an activating portion protruding through the through hole;
   wherein the activating member is enabled to activate the pressing member when the activating portion is pressed, and the pressing portion is driven to move along the first direction when the pressing portion is pressed.

2. The portable apparatus as claimed in claim 1, wherein the pressing member defines a locking groove, and the cover comprises a locking portion with an inclined contact surface which inclines away from the cover along the first direction, the locking portion is received in the locking groove when the pressing member is locked on the cover.

3. The portable apparatus as claimed in claim 2, wherein the pressing member comprises a deformable locking arm, the locking groove is defined in the locking arm.

4. The portable apparatus as claimed in claim 2, wherein the cover comprises a plurality of guiding posts which are arranged collinear with the locking portion and the through hole, the pressing member comprises a base defining a plurality of guiding groove corresponding to the guiding posts and moveable receiving the guiding posts.

5. The portable apparatus as claimed in claim 1, wherein the fastening device comprises a first resilient member resisting between the cover and the pressing member, the first resilient member is compressed while the pressing member moves along the first direction for providing a driving force to press the pressing member along the second direction.

6. The portable apparatus as claimed in claim 1, wherein the fastening device further comprises a second resilient member disposed between the locking member and the cover, the second resilient member may twist while the locking member is lifted by the pressing member.

7. The portable apparatus as claimed in claim 1, wherein the locking member is pivotally attached on the cover.

8. The portable apparatus as claimed in claim 7, wherein the driving portion comprises a driving surface resisting with the locking member, the locking member slides on the driving surface while the pressing member is pressed.

9. The portable apparatus as claimed in claim 8, wherein the driving portion further comprises two supporting surfaces connecting with two opposite edges of the driving surface, the locking member comprises a driven surface engageable with driving surface and a supported surface switchable supported on the two supporting surface.

10. The portable apparatus as claimed in claim 9, wherein a projection of one of the two supporting surfaces is not overlapped on the other one in a plane parallel with the two supporting surfaces.

11. A locking mechanism for locking a hook formed on a cover in an electronic device and unlocking the hook, the locking mechanism comprising:
   a pressing member slideablely attached on the cover;
   a locking member pivotally disposed on the cover, the locking member engaging with the pressing member, the locking member comprising an inserting portion capable of inserting into the electronic device to lock the hook in the electronic device; and
   an activating member disposed on the cover, a portion of the activating member located between the cover and the pressing member;
   wherein the pressing member is locked on the cover and drives the inserting portion back from the electronic device when being pressed, the pressing member is unlocked and drives the inserting portion insert into the electronic device to lock the hook in the electronic device when being activated by the activating member.

12. The locking mechanism as claimed in claim 11, wherein the pressing member comprises a driving portion with a driving surface for pushing the locking member to drive the locking member.

13. The locking mechanism as claimed in claim 11, wherein the pressing member defines a locking groove, the pressing member slides on an inclined contact surface of a locking portion of the cover and lock on the locking portion.

14. The locking mechanism as claimed in claim 13, wherein the pressing member comprises an elongated deformable locking arm, the locking groove is defined on a free end of the locking arm.

15. The locking mechanism as claimed in claim 11, wherein the locking mechanism comprises a first resilient member to draw the pressing member to move back while being unlocked.

16. The locking mechanism as claimed in claim 11, wherein the activating member comprises an activating portion protruding through the cover for being activated.

17. The locking mechanism as claimed in claim 16, wherein the activating member is fixed on the cover, and further comprises an elongated deformable activating arm, the activating portion is disposed on the activating arm.

18. A fastening device comprising:
   a cover comprising a hook, the cover capable of being locked and unlocked on an electronic device, and the cover further defining an opening near the hook and a through hole;
   a pressing member moveable disposed on the cover, the pressing member locked on the cover while being pressed;
   a locking member disposed on the cover and engaging with the pressing member, the locking member comprising an inserting portion protrudable through the opening for inserting into the electronic device to lock the hook on the electronic device, the inserting portion of the locking member is driven to withdraw from the electronic device when the pressing member is pressed;

an activating member comprising an activating portion protrudable through the through hole, the activating member activating the pressing member to unlock from the cover while the activating portion is activated, and the pressing member moving away from the locking member and the inserting portion of the locking member protruding from the opening to insert into the electronic device.

19. The fastening device as claimed in claim 18, wherein the locking member is pivotally attached on the cover.

20. The fastening device as claimed in claim 18, wherein the pressing member comprises a driving portion with a driving surface resisting against the locking member.

* * * * *